Sept. 14, 1926.  
K. EHRGOTT  
1,599,560  
ELECTRIC TOASTER  
Filed March 13, 1924  
2 Sheets-Sheet 1

WITNESSES:  
R. S. Harrison  
H. M. Biebel

INVENTOR  
Karl Ehrgott  
BY  
Aberley G. Carr  
ATTORNEY

Sept. 14, 1926.

K. EHRGOTT 1,599,560

ELECTRIC TOASTER

Filed March 13, 1924

WITNESSES:

INVENTOR
Karl Ehrgott
BY

ATTORNEY

Patented Sept. 14, 1926.

1,599,560

UNITED STATES PATENT OFFICE.

KARL EHRGOTT, OF FORREST HILLS BOROUGH, PENNSYLVANIA, ASSIGNOR TO WESTINGHOUSE ELECTRIC & MANUFACTURING COMPANY, A CORPORATION OF PENNSYLVANIA.

ELECTRIC TOASTER.

Application filed March 13, 1924. Serial No. 698,887.

My invention relates to toasters and particularly to hotel type electric toasters.

The object of my invention is to provide a multiple-slice toaster having a relatively simple tiltable means for removing toasted slices of bread therefrom.

In practicing my invention, I provide a heat-insulated casing having an open front and having a plurality of spaced and vertically-extending electric heating elements located therein. A material-holder is supported in said casing upon a fixed and a movable support in such manner that it is tilted downwardly when moved outwardly from said casing.

Figure 1:
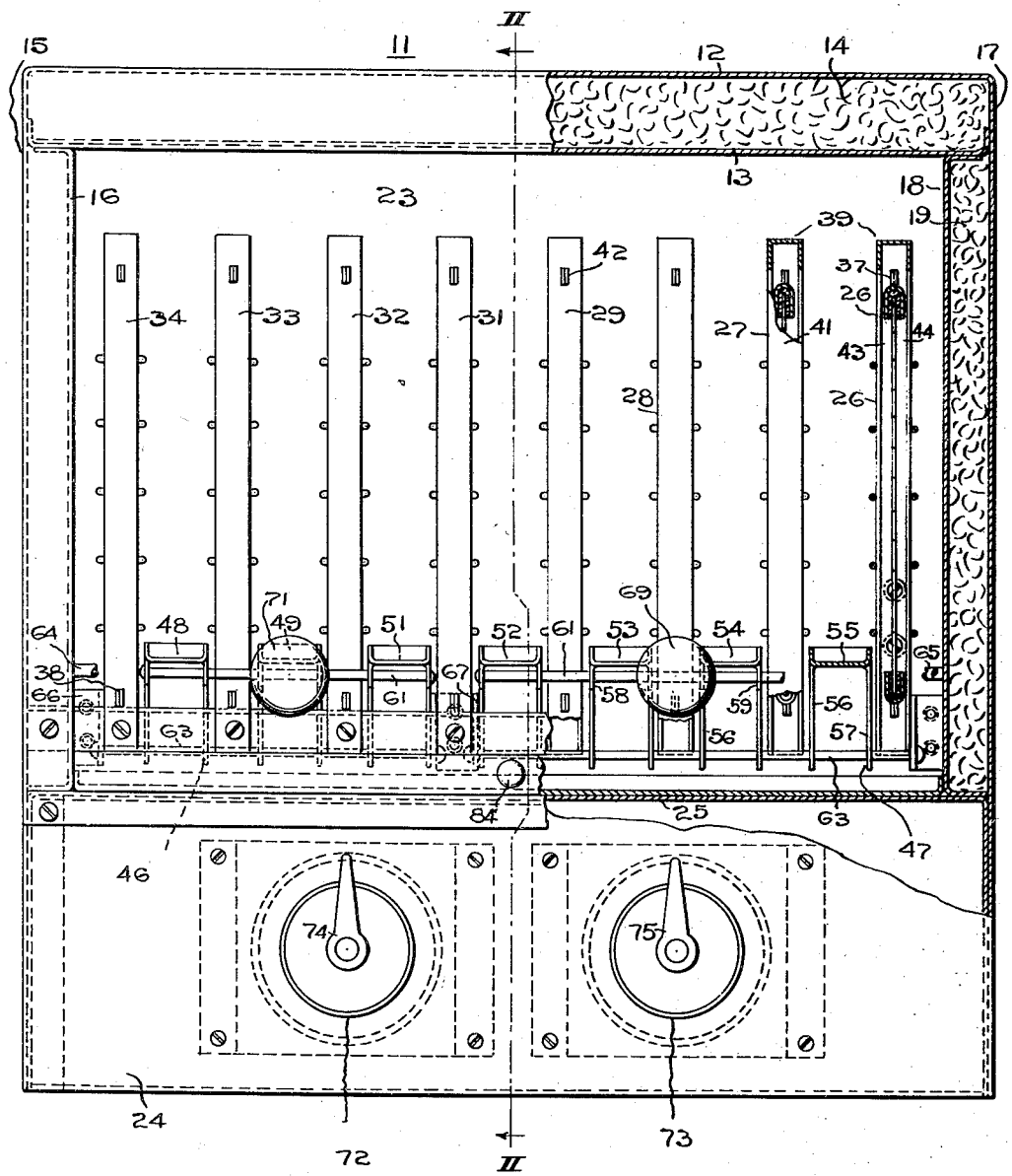
Figure 1 is a front elevational view of a toaster embodying my invention.

A toaster 11 comprises a casing that is built up of sheet metal members. A top portion of the casing comprises an outer sheet metal plate 12 and an inner sheet metal member or plate 13, that are suitably held in spaced relation to provide a place for a mass 14, of a suitable heat-insulating material, such as mineral wool, located therebetween. Side portions of the casing severally comprise an outer sheet metal member 15 and a co-operating inner sheet metal member 16 located at the left hand side of the casing, and a corresponding outer sheet metal member 17 and an inner sheet metal member 18 located at the right hand side thereof. The respective inner and outer side plates are spaced apart to provide for disposing therebetween a mass 19 of a suitable heat-insulating material, such as mineral wool.

The outer plates 15 and 17 extend from the top of the casing to substantially the bottom thereof, while the respective inner plates 16 and 18 extend only partially down the sides of the casing. A sheet metal member 21 constitutes the rear wall of the casing, while an intermediate and vertically extending sheet metal plate 22 extends from the lower surface of the plate 13 as far downwardly as do the plates 16 and 18 in order to provide a heating chamber 23 within the casing.

The upper portion of the casing is open at the front thereof and a sheet metal plate 24 is provided at the lower front portion thereof extending upwardly as far as the plates 16 and 18. A horizontally-extending sheet metal plate 25 constitutes a bottom closure for the heating chamber 23. The bottom of the casing may be left open, as is illustrated more particularly in Fig. 2 of the drawings, in order to permit of placing therethrough the supply circuit leads to be hereinafter described to permit of energizing the electric heating elements.

A plurality of electric heating elements 26, 27, 28, 29, 31, 32, 33 and 34 are located in substantially vertically-extending and spaced positions within the heating chamber 23. The respective heating elements may be built up in any suitable or desired construction and, as illustrated in the drawings, severally comprise a pair of mica plates 35 and 36, that are located in alined positions relatively to each other.

The plates 35 and 36 are clamped between an upper sheet metal member 37 that is folded over longitudinally thereof on its center line, and a substantially similar sheet metal member 38, located at the bottom of the plates 35 and 36. The ends of the members 37 and 38 are made of reduced area and fit into a protecting member 39, that may be constituted by a plate of sheet metal bent to substantially U-shape, as is illustrated in Fig. 1 of the drawings, an integral portion 41 thereof being bent at right angles thereto to provide a closure for the front end thereof.

The reduced end portions of the members 37 and 38 are located in suitable openings 42 in the portions 41 in order to hold the front of the heating element in proper operative positions within the members 39.

The rear reduced end portions of the members 37 and 38 may extend through suitable openings in the plates 22 hereinbefore described. The vertically extending portions of the members 39 have a relatively large opening 43 on one side thereof, and a similar opening 44 on the other side thereof, in order that the electric resistor member 45 wound upon the plates 35 and 36, may transmit the greater part of the heat generated therein by direct radiation.

While I have illustrated and described a specific embodiment of extended electric heating elements and projecting casings therefor, I do not desire to be limited to the particular construction described as this is illustrative only.

Means for moving a plurality of slices of bread into position between the spaced heating elements to be toasted and for moving them outwardly and away therefrom after having been toasted, comprising a pair of material holders numbered respectively 46 and 47. Each of these material holders comprises a plurality of individual supporting means for slices of bread, these supports being numbered 48, 49 and 51, respectively, for the one material holder, and 52, 53, 54 and 55 for the other material holder.

Each of the supports for the individual slices of bread comprises a sheet metal member that is bent to substantially channel shape in lateral section and having also a pair of integral depending and laterally-spaced lugs 56 and 57 located intermediate the ends thereof but somewhat nearer to the rear end than to the front end thereof.

At the front end of each of the members 52 and 55, there are provided integral and depending lugs 58 and 59, respectively, through which there extends a rod 61 that is of substantially square section and that is suitably secured to the respective depending lugs 58 and 59, of each of the members 52 to 55, inclusive.

All of the depending lugs 56 and 57 are provided with an opening 62 and a rod 63 extends therethrough, the openings 62 being located in alined position. The hereinbefore described construction of the material holder 47 provides a relatively stiff structure, the integral parts of which are held in their proper operative positions by the rods 61 and 63 respectively.

The construction of the material holder 46 need not be further described, as it is substantially identical with the one numbered 47, except as to the number of individual slice holders.

When in its normal operative position, the material holder 47 is supported by a rod 64 extending laterally of the toaster at the front thereof, and by a second rod 65 parallel to the rod 64 and located immediately in front of the intermediate plate 22 and supporting the rear portions thereof.

A metal bar 66 is secured to the front surface of the plate 22 adjacent to the inner surface of the side plate 18, and a second and similar bar 67 is provided intermediate the sides of the casing and suitably secured against the intermediate plate 22 and a portion of the front part of the casing immediately below the heating chamber 23. Each of the members 66 and 67 is provided with a slot 68 that is located in an angularly disposed position relative to the bottom of the heating elements, the rear ends thereof being lower than the front ends thereof.

The rod 63 extends through the slots 68 in the members 66 and 67 and is adapted to move therein when the material holder 47 is moved forwardly and outwardly of the casing by the operator grasping a heat insulating knob 69 that is secured to the rod 61. The second material holder 46 is provided with a similar knob 71.

A plurality of suitable controlling means comprising snap switches 72 and 73 are located within the lower portion of the casing, the operating handles 74 and 75 being located at the front of the bottom plate 24. A plurality of supply circuit leads 76 and 77 are brought into the lower part of the casing and have their ends electrically connected to the respective switches 72 and 73 and a plurality of conducting leads designated by the numeral 78 connect the terminals of the other switches 72 and 73 to the respective groups of heating elements that co-operate with the respective material holders 46 and 47.

A plurality of terminal members 79 and 81 are insulatedly mounted on the intermediate plate 22 and the ends of the leads 78 are connected thereto in such manner that suitable control of the energization of the respective spaced heating elements may be effected. The construction of these terminal members is not a part of my invention, and it is not believed necessary to describe these in detail.

A laterally-extending stiffening member 82, of substantially L-shape, is provided beneath the material holders and is suitably secured to the front plate of the casing below the heating elements, as is illustrated more particularly in Fig. 2 of the drawings. A crumb tray 83 is located between the material holders and the heating elements and may be moved outwardly by a heat insulating knob 84.

Figure 2:
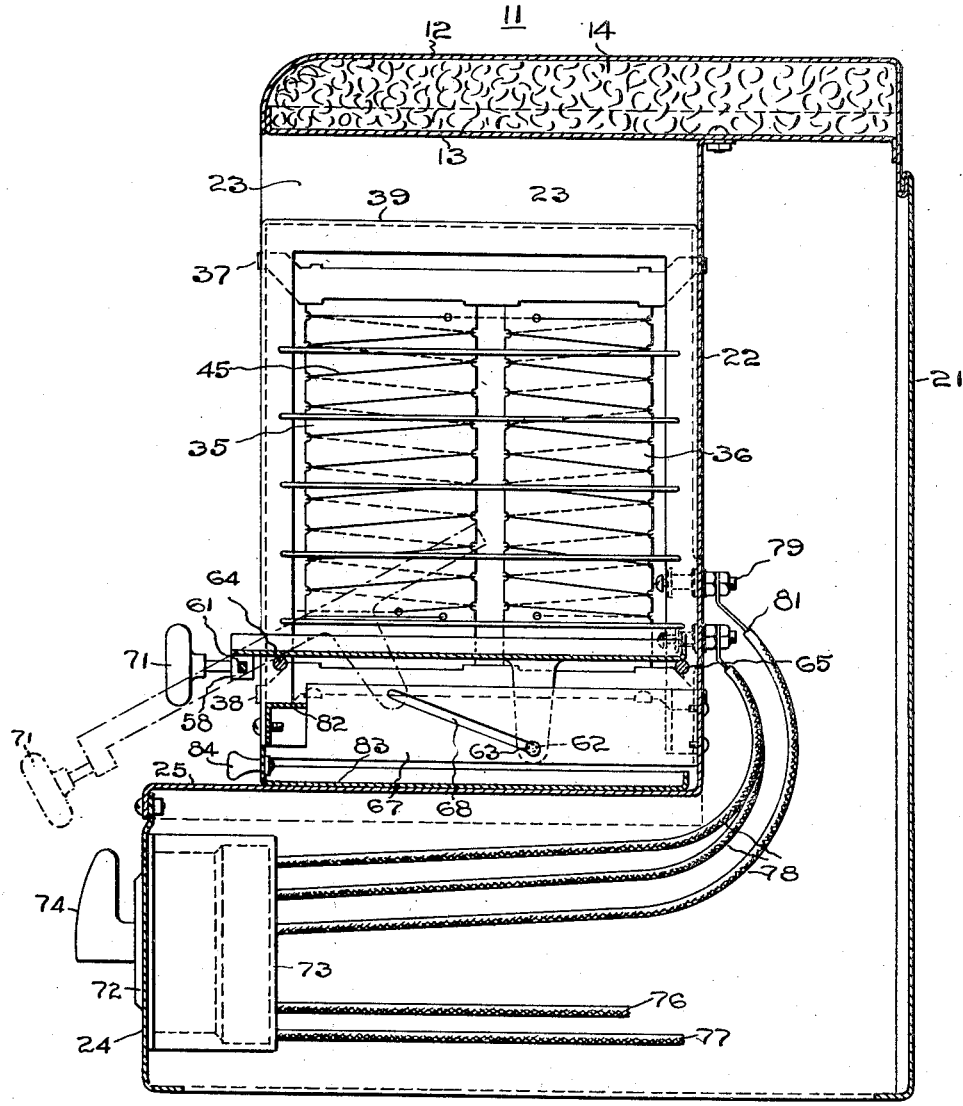
Fig. 2 is a view in longitudinal vertical section therethrough, taken on the line II—II of Fig. 1.

If it is assumed that a plurality of slices of bread have been located in a substantially vertical position on the material holder 47 and toasted, and the operator desires to remove them, he pulls outwardly and downwardly on the handle 69, causing the rod 63 to move upwardly and outwardly in the respective slots 68, and causing the rear end of the material holder to move upwardly, thereby effecting a tilting downward movement of the material holder as is more particularly illustrated in the broken line view of the material holder in Fig. 2 of the drawing.

This downward-tilting action of the forward end of the material holders permits of the slices of bread sliding forwardly and downwardly out of the respective slice holders onto a suitable receiving surface from which they may be removed by the operator.

The material holders may be moved inwardly for a portion of the distance, before another plurality of slices of bread is located thereon, the tilting movement of the material holder being of value in this particular connection because the upward forward corner of the respective slices of bread will still be well without or away from the spaced heating elements, thereby permitting the operator to place slices of bread upon the holders without bringing his hands or fingers in contact with the heated resistor members.

The device embodying my invention thus provides a relatively small, compact and manually operable means for moving a plurality of slices of bread into operative engagement with a plurality of spaced electric heating elements, and of removing the toasted slices of bread by a reverse movement of the holder, the inside holder having a tilting movement simultaneously with its forward or rearward movement.

Various modifications and changes may be made without departing from the spirit and scope of the invention, I desire therefore, that only such limitations shall be placed thereon as are imposed by the prior art.

I claim as my invention:

1. In a toaster, in combination, an electric heating element, a material holder movable relatively to said heating element, and a plurality of supporting means for said material holder, said supporting means approaching each other during said movement and causing a tilting movement of said holder.

2. In a toaster, in combination, a casing, a member in said casing having a slot therein, an electric heating element in said casing, a material-holder movable relatively to said casing, and means on said material-holder moving in said slot to tilt the material-holder upon movement thereof.

3. In a toaster, in combination, a casing, an electric heating element in said casing, a member in said casing having a slot therein angularly disposed relatively to said heating element, a support in said casing, a material-holder movable relatively to said casing and resting upon said support, and means on said material-holder moving in said slot to tilt the material-holder downwardly when the same is moved outwardly of said casing.

4. In a toaster, in combination, an electric heating element, a material-holding means horizontally movable away from and toward said heating element, and means operatively engaging said material-holder and effective to cause it to tilt downwardly when moved away from said heating element.

5. In a toaster, in combination, a heat-insulating casing having an open front, a plurality of spaced and vertically-extending electric heating elements in said casing, means for holding a plurality of slices of bread between said heating elements, said means being movable in a substantially horizontal direction away from and toward said heating elements, means for supporting said material holding means, and means operatively engaging said material-holder and co-operating with said supporting means for causing the material-holder to tilt downwardly upon movement thereof away from the heating elements.

6. In a toaster, in combination, a heat-insulating casing having an open front, a plurality of spaced and vertically extending electric heating elements in said casing, means for holding a plurality of slices of bread between said heating elements, said means being movable in a substantially horizontal direction away from and toward said casing, a member in said casing having a slot therein angularly disposed relatively to said heating element, a support for said holder, and means on said holder moving in said slot and effective to tilt the holder downwardly when it is moved away from said heating elements.

In testimony whereof, I have hereunto subscribed my name this 5th day of March 1924.

KARL EHRGOTT.